(12) United States Patent
Hallbauer et al.

(10) Patent No.: US 10,640,072 B2
(45) Date of Patent: May 5, 2020

(54) VEHICLE SEATS FOR MOTOR VEHICLES

(71) Applicant: TAKATA AG, Aschaffenburg (DE)

(72) Inventors: Karsten Hallbauer, Staig (DE);
Hans-Peter Sendelbach, Senden (DE);
Volker Rathgeb, Allmendingen (DE);
Uwe Dierks, Blaubeuren (DE)

(73) Assignee: JOYSON SAFETY SYSTEMS GERMANY GMBH, Aschaffenburg (DE)

(*) Notice: Subject to any disclaimer, the term of this patent is extended or adjusted under 35 U.S.C. 154(b) by 130 days.

(21) Appl. No.: 15/893,987

(22) Filed: Feb. 12, 2018

(65) Prior Publication Data
US 2018/0236964 A1  Aug. 23, 2018

(30) Foreign Application Priority Data
Feb. 22, 2017  (DE) .......... 10 2017 202 868

(51) Int. Cl.
| | | |
|---|---|---|
| *B60R 21/231* | (2011.01) | |
| *B60R 21/2338* | (2011.01) | |
| *B60R 21/207* | (2006.01) | |
| *B60R 21/217* | (2011.01) | |
| *B60R 21/235* | (2006.01) | |

(52) U.S. Cl.
CPC .......... *B60R 21/231* (2013.01); *B60R 21/207* (2013.01); *B60R 21/217* (2013.01); *B60R 21/2338* (2013.01); *B60R 21/235* (2013.01); *B60R 2021/23386* (2013.01); *B60R 2021/23509* (2013.01); *B60R 2021/23571* (2013.01)

(58) Field of Classification Search
CPC . B60R 21/231; B60R 21/2338; B60R 21/207; B60R 21/217; B60R 2021/23386; B60R 2021/23509; B60R 21/235; B60R 2021/23571
See application file for complete search history.

(56) References Cited

U.S. PATENT DOCUMENTS

| | | | |
|---|---|---|---|
| 5,636,862 A | 6/1997 | Cheung et al. | |
| 6,450,528 B1 | 9/2002 | Suezawa et al. | |
| 6,592,144 B2 | 7/2003 | Acker et al. | |
| 7,281,733 B2 | 10/2007 | Pieruch | |
| 7,393,005 B2 * | 7/2008 | Inazu ............... | B60N 2/5825 280/728.2 |
| 8,047,564 B2 | 11/2011 | Kibat et al. | |
| 8,282,126 B2 | 10/2012 | Wiik et al. | |

(Continued)

FOREIGN PATENT DOCUMENTS

| | | |
|---|---|---|
| DE | 10 2004 007 630 A1 | 10/2005 |
| DE | 699 32 210 T2 | 5/2007 |

(Continued)

*Primary Examiner* — Drew J Brown
(74) *Attorney, Agent, or Firm* — Gordon Rees Scully Mansukhani, LLP (57) ABSTRACT

It is provided a vehicle seat for a motor vehicle, comprising a gas bag inflatable for the protection of a vehicle occupant, which in the inflated condition extends on a side of the vehicle seat facing a vehicle interior; and a retaining element via which the gas bag is connected with a backrest frame of the vehicle seat. There is further provided at least one fastening structure molded to the retaining element, via which a positive connection of the retaining element with the backrest frame exists.

20 Claims, 13 Drawing Sheets

(56) References Cited

U.S. PATENT DOCUMENTS

| | | | |
|---|---|---|---|
| 8,684,408 B2 | 4/2014 | Thomas et al. | |
| 2008/0100044 A1* | 5/2008 | Cho | B60R 21/207 |
| | | | 280/730.2 |
| 2009/0014990 A1 | 1/2009 | Loibl et al. | |
| 2011/0025034 A1 | 2/2011 | Lim et al. | |
| 2012/0049498 A1 | 3/2012 | Wiik et al. | |
| 2013/0119646 A1* | 5/2013 | Tracht | B60R 21/207 |
| | | | 280/730.1 |
| 2015/0367803 A1* | 12/2015 | Fujiwara | B60R 21/207 |
| | | | 280/728.2 |
| 2016/0031406 A1 | 2/2016 | Yamanaka et al. | |
| 2016/0031407 A1* | 2/2016 | Yamanaka | B60R 21/233 |
| | | | 280/728.2 |
| 2017/0182963 A1* | 6/2017 | Hiraiwa | B60R 21/233 |
| 2018/0093633 A1* | 4/2018 | Komura | B60R 21/217 |
| 2018/0222435 A1* | 8/2018 | Fukawatase | B60R 21/23138 |
| 2019/0225183 A1* | 7/2019 | Garnier | B60R 21/23138 |

FOREIGN PATENT DOCUMENTS

| | | |
|---|---|---|
| DE | 10 2005 059 197 B4 | 4/2008 |
| DE | 10 2009 044 732 A1 | 2/2011 |
| DE | 10 2010 039 882 A1 | 3/2011 |
| DE | 10 2011 081 478 A1 | 3/2012 |
| EP | 1 199 227 A1 | 4/2002 |
| EP | 2 960 116 A1 | 12/2015 |

\* cited by examiner

VEHICLE SEATS FOR MOTOR VEHICLES

REFERENCE TO RELATED APPLICATION

This application claims priority to German Patent Application No. 10 2017 202 868.8 filed on Feb. 22, 2017, the entirety of which is incorporated by reference herein.

BACKGROUND

This invention relates to vehicle seats.

From the prior art vehicle seats are known, which in addition to a conventional side gas bag, which in the case of activation extends on an outer side of the vehicle seat, include a gas bag ("far-side" gas bag) deploying on the side of the vehicle seat facing the vehicle interior. A far-side gas bag serves to protect the vehicle occupant sitting on the seat in the case of a collision on the more remote vehicle long side and in particular will limit a movement of the vehicle occupant towards this point of collision. A far-side gas bag is known for example from DE 10 2005 059 197 B4. As a far-side gas bag deploys in the region of the middle of the vehicle interior space, a support of the gas bag on the vehicle seat as stable as possible is required.

SUMMARY

A problem underlying the invention consists in creating a stable support of a far-side gas bag, which can be realized in the easiest possible way.

The problem is solved by the provision of a vehicle seat with features as described herein. Developments of the invention are indicated in the dependent claims.

Accordingly, there is provided a vehicle seat for a motor vehicle, comprising
 a gas bag inflatable for the protection of a vehicle occupant, wherein the gas bag in the inflated condition extends on a side of the vehicle seat facing the vehicle interior,
 a retaining element via which the gas bag is (in particular directly) connected with a backrest frame of the vehicle seat; and
 at least one fastening structure molded (in particular integrally) to the retaining element, via which a positive connection of the retaining element with the backrest frame exists.

By means of the retaining element (in particular formed in the form of a retaining plate) and the fastening structure a stable connection of the far-side gas bag to the frame of the backrest of the vehicle seat can be accomplished in a simple way, which in particular also in an impact of a vehicle occupant sitting on the seat supports the deployed (in particular sealed) gas bag. For example, with the connection of the gas bag via the retaining element also without the gas bag being supported on other vehicle components (e.g. a center console) a sufficient stabilization of the gas bag is effected. There can also be achieved a consistently good restraining effect of the gas bag independent of the position of the vehicle seat. Furthermore, the connection of the retaining element to the backrest frame by form fit provides for a thinner and/or skeletal and hence a weight-reduced configuration of the retaining element.

The vehicle seat in particular is a driver's seat, so that the gas bag deploys on a side of the seat facing the front-passenger seat. It is also conceivable, however, that the vehicle seat according to the invention constitutes a front-passenger seat.

For example, the fastening structure encloses a portion of the backrest frame (in particular of a lateral frame part). Via the fastening structure, the retaining element in particular is connected with a front region of the backrest frame as seen in the direction of forward travel. The fastening structure for example encloses a front portion of the backrest frame and in particular a side of the front portion pointing in the direction of forward travel. In this way, forces produced in an impact of the vehicle occupant onto the gas bag are introduced into the backrest frame via the positive connection of the retaining element to the front portion of the backrest frame.

The fastening structure for example can comprise several (e.g. finger-like) protrusions spaced apart from each other, which each enclose the front portion of the backrest frame. In particular, the protrusions are arranged along the vertical direction of the retaining element (of the backrest of the vehicle seat). It is also conceivable that the fastening structure extends through an opening formed in the front region of the backrest frame. What is also possible is a latching connection between the retaining element and the front portion of the backrest frame.

The (e.g. oblong) retaining element extends along the backrest frame in particular in a vertical direction (the vehicle height direction) (in particular along a lateral frame part extending in the vertical direction). For example, the retaining element has a vertical length which is at least one third or at least half of the vertical length (height) of the backrest frame. Correspondingly, the fastening structure also can extend in a vertical direction over a larger vertical portion of the backrest frame (e.g. likewise over at least one third or at least one half of the height of the backrest frame), so that a rather long front fastening region is obtained, via which the retaining element and hence the gas bag is fixed to the backrest frame and via which the folded gas bag is supported. An additional support of the gas bag can be effected by a connection of the gas bag also to a rear region (e.g. in the region of the gas generator) of the backrest frame.

According to another aspect of the invention the gas bag is connected with the retaining element via at least one connecting element. The connecting element for example is designed such that—based on the inflated condition of the gas bag—it extends along a vertical extension of the gas bag; e.g. at least over one third of the height of the inflated gas bag. It is conceivable that the connecting element is formed by a fabric element fixed to the gas bag, wherein the fabric element for example is formed of the same material as the gas bag. It is also possible that the connecting element is sewn to the gas bag or cohesively connected with the gas bag (for example by a welded connection or an adhesive connection).

The connection between the connecting element and the retaining element for example is effected by form fit or by a combination of a positive connection and a non-positive connection. The connecting element can include at least one fastening opening via which it is positively connected with the retaining element. It is conceivable here that the connection between the connecting element and the retaining element consists in that the fastening structure molded to the retaining element also extends through the fastening opening of the connecting element. Thus, the fastening structure not only serves for fastening the retaining element to the backrest frame, but also for connecting the gas bag with the retaining element.

It is also conceivable, however, that the retaining element includes a connecting structure separate from the fastening structure, which engages into the fastening opening of the connecting element.

According to another development of the invention, the vehicle seat comprises a housing in which the gas bag and e.g. also a gas generator for inflating the gas bag is arranged, wherein the retaining element is formed by a portion of the housing. For example, the housing includes a first and a second housing part, wherein the first housing part, which is formed e.g. in the form of a housing lower shell, is arranged facing the backrest frame and forms the retaining element as well as the fastening structure.

In another aspect the invention relates to vehicle seat for a motor vehicle, comprising
- a gas bag inflatable for the protection of a vehicle occupant, wherein the gas bag in the inflated condition extends on a side of the vehicle seat facing the vehicle interior;
- a retaining element via which the gas bag is connected with a backrest frame of the vehicle seat;
- at least one connecting element via which the gas bag is connected with the retaining element, wherein
- the connecting element with one portion extends on an inner side of at least one portion of the backrest frame.

The "inner side" of the backrest frame designates that side of the backrest frame which faces the interior of the backrest and hence faces away from the gas bag. In particular, the connecting element extends such that after an activation of the gas bag and an impact of the vehicle occupant onto the gas bag it sectionally comes to bear against at least a portion of the inner side of the backrest frame, whereby an abutment is formed, which counteracts a movement of the gas bag (in particular towards the point of collision).

The retaining element can be formed by a gas generator support via which a gas generator for inflating the gas bag also is fixed to the backrest frame. For example, the gas generator (and in particular also the gas generator support) is arranged on an outer side of the backrest frame and hence on a side of the backrest frame facing away from the connecting element.

It is also conceivable that the connecting element extends over the entire inner side of the backrest frame. Thus—based on the inflated condition of the gas bag—a portion of the connecting element can extend before the backrest frame and another portion of the connecting element can extend behind the backrest frame, as seen in the direction of forward travel.

According to another development of the second aspect of the invention the retaining element likewise is arranged on the inner side of the backrest frame. Here, it is conceivable that a gas generator support is arranged on the outer side of the backrest frame, wherein the retaining element is connected with the gas generator support via at least one fastening element (for example in the form of a screw or a hook) which extends through an opening in the backrest frame.

BRIEF DESCRIPTION OF THE DRAWINGS

The invention will be explained in detail below by means of exemplary embodiments with reference to the Figures.

DETAILED DESCRIPTION

The backrest assembly of a vehicle seat according to the invention as shown in FIGS. 1 to 4 comprises a frame part 1 of a frame of a backrest of the seat, wherein an in particular one-part retaining element 2 fabricated for example from a metal sheet or a plastic material is attached to the frame part 1. Via the retaining element 2 a far-side gas bag 3 (shown in the inflated condition) is attached to the frame part 1.

The retaining element 2 includes several cutouts 21, so that it has a skeletal structure. Furthermore, the retaining element 2 has a longitudinal edge 22 which forms a fastening structure in the form of several protrusions 23 spaced apart from each other and protruding from the edge 22. The protrusions 23 enclose a front portion 12 of the frame part 1—based on the direction of forward travel—, which extends substantially vertically to a base portion 11 of the frame part 1 and has a side 126 pointing in the direction of forward travel. By means of the protrusions 23 enclosing the front portion 12, a positive connection is formed between the retaining element 2 and the frame part 1.

The gas bag 3 in turn is connected with the retaining element 2 via a connecting element in the form of a fabric element 4 (which for example includes at least one fabric layer), wherein the fabric element 4 is fixed to a layer 31 of the gas bag 3 via seams 41a, 41b. It is possible that the fabric element 4 is formed from two fabric layers 400a, 400b which are connected with each other via a seam 401.

Figure 1:
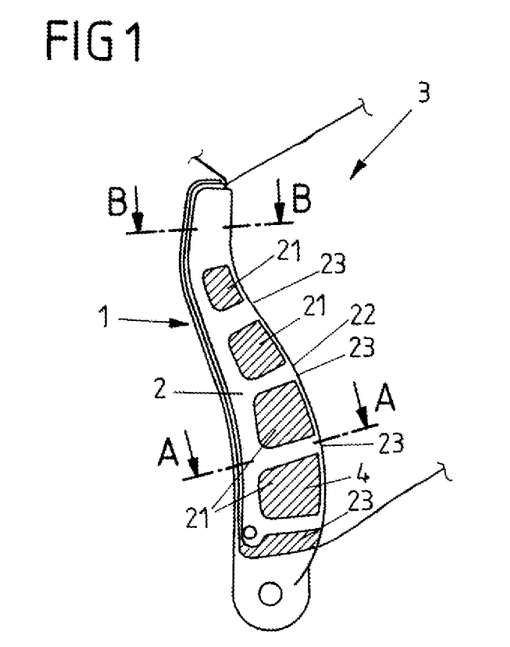
FIG. 1 shows a lateral view of a backrest assembly of a vehicle according to a first exemplary embodiment of the invention.
Figure 2:
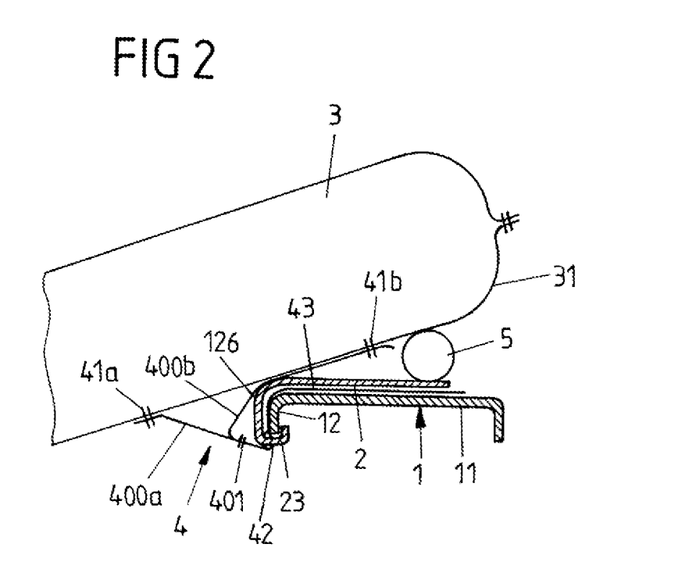
FIG. 2 shows a section along A-A in FIG. 1 after activation of the gas bag.
Figure 3:
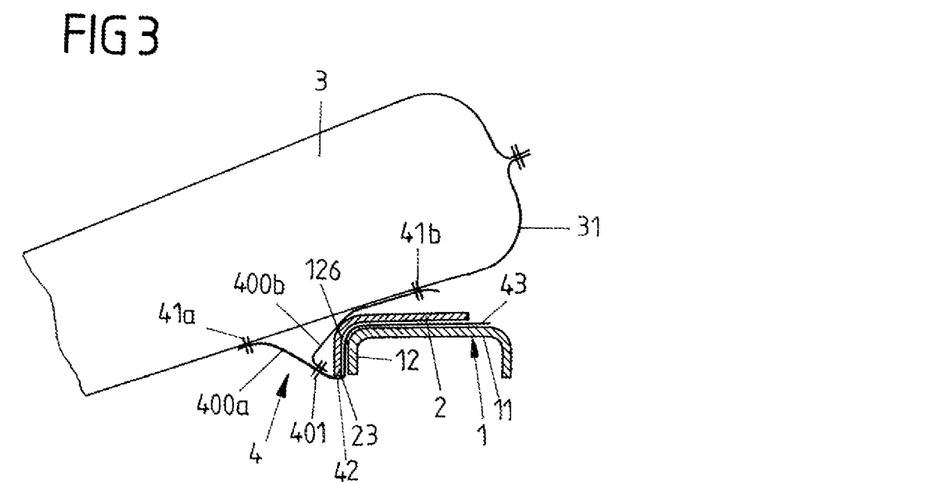
FIG. 3 shows a section along B-B in FIG. 1.

The fabric element 4 includes several openings 41 spaced apart from each other in a vertical direction, through which the protrusions 23 extend, whereby the fabric element 4 and hence the gas bag 3 are fixed to the front portion 12 of the retaining element 2. Moreover, a portion 43 of the fabric element 4 can extend between the retaining element 2 and an outer side of the frame part 1 and be clamped there (FIGS. 2 and 3).

Figure 4:
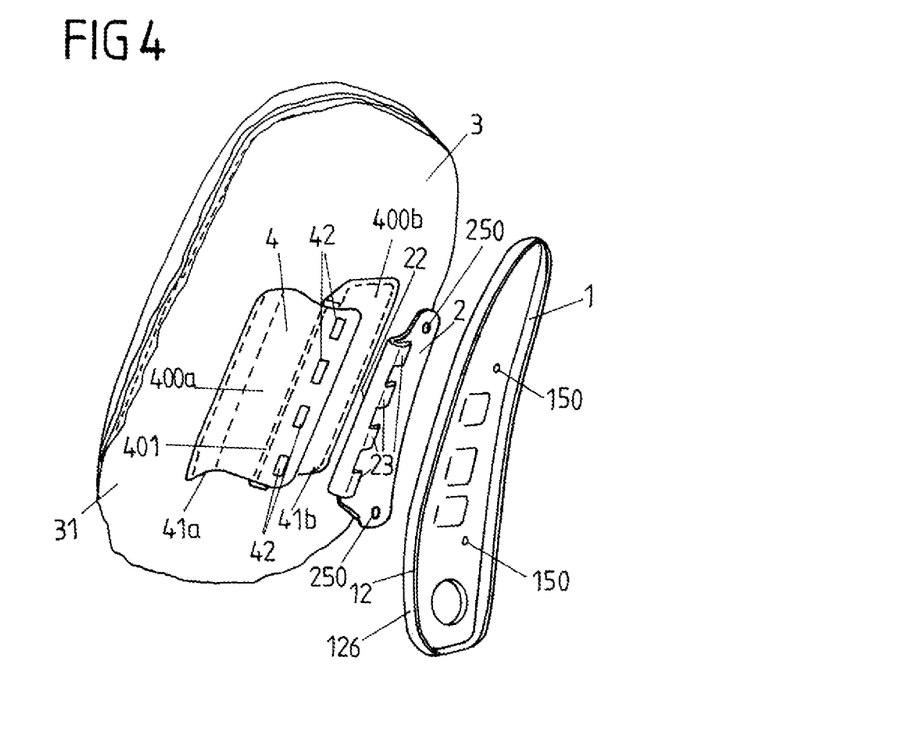
FIG. 4 shows a perspective view of a modification of the assembly of FIG. 1.

The retaining element 2 and also the fabric element 4 each extend for example over at least one third (FIG. 4) or at least one half (FIG. 1) of the vertical length (the height) of the frame part 1 in order to create a front connecting region as long as possible and hence a stabilization of the inflated gas bag as good as possible. Optionally, the retaining element 2 can additionally be fixed to the frame part 1 by a screw or rivet connection; FIG. 4 shows the fastening openings 150, 250 provided for this purpose in the frame part 150 and in the retaining element 2.

On an outer side of the frame part 1 there is also mounted a gas generator 5 for inflating the gas bag 3 (FIGS. 2 and 3), e.g. via a separate gas generator support. In the region of the gas generator 5 the gas bag 3 in particular is likewise connected with the frame part 1, whereby it experiences an additional support. The stabilization of the gas bag thus is effected via the connection in the region of the gas generator 5 and in particular via the connection to the front portion 12 of the frame part 1 via the tabs 23 of the retaining element 2.

Figure 5:
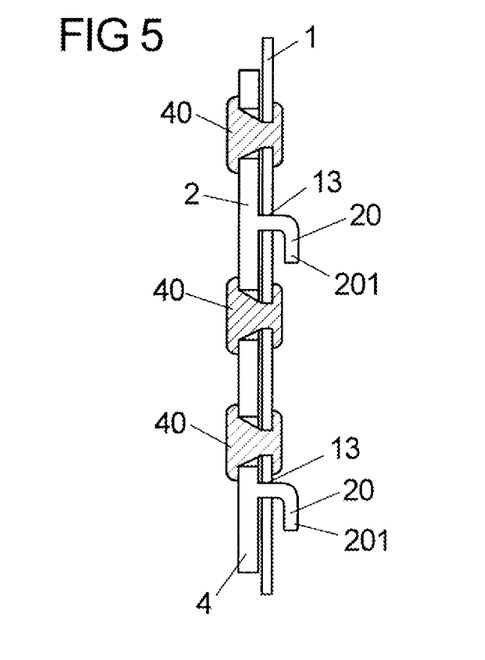
FIG. 5 shows a sectional view of a retaining element of a vehicle seat according to a second exemplary embodiment of the invention.

FIG. 5 relates to another exemplary embodiment of the vehicle seat according to the invention, wherein this Figure shows a sectional view of only a part of a backrest of the vehicle seat. The retaining element 2 for fixing a gas bag (not shown in FIG. 5) to the frame part 1 of the backrest frame here comprises a fastening structure which is formed by a plurality of hook-like tabs 20 which each extend through an opening 13 in the frame part 1. An end portion 201 of the hook-like tabs 20 each engages behind the frame part 1 and hence fixes the retaining element 2 to the frame part 1.

Furthermore, a fabric element 4 is present, via which the gas bag 3 is fixed to the retaining element 2 and the frame part 1. Fixing of this fabric part 4 is effected via rivets 40 which extend through the retaining element 2, the fabric element 4 sectionally extending between the retaining element 2 and the frame part 1, and through the frame part 1. Moreover, the fabric element 4 is sectionally clamped between the retaining element 2 and the frame part 1.

Figure 6:
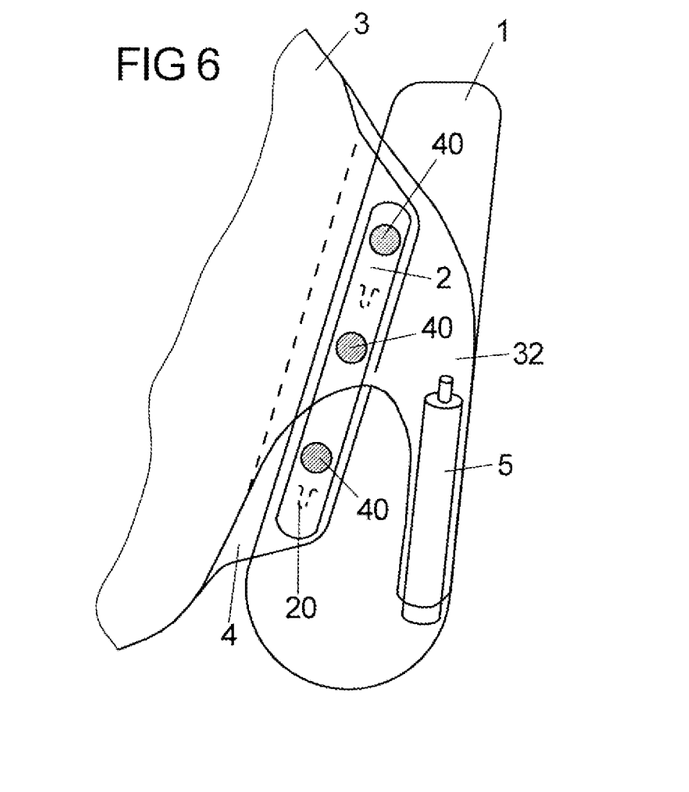
FIG. 6 shows an assembly mounted on a seat frame of the vehicle seat with the retaining element of FIG. 5.

As shown in FIG. 6, a gas generator 5 additionally is present on the frame part 1, which in part extends into an inflation orifice 32 of the gas bag 3. Fastening of the gas generator 5 is effected e.g. without a gas generator support directly at the frame part 1 (via stay bolts). The gas generator 5 and the gas bag 3 can be arranged in a hard- or soft-cover housing.

FIGS. 7 to 11 relate to another exemplary embodiment of the vehicle seat according to the invention. Accordingly, the retaining element 2 is formed to fix the gas bag 3 to the frame part 1 of the backrest of the vehicle seat by a housing part (housing lower shell 61) of a gas bag module housing in which the folded gas bag 3 and the gas generator 5 are accommodated. The gas generator 5 is connected with the frame part 1 by means of a stay bolt 51 which extends through the housing lower shell 61. The housing lower shell 61 is fabricated e.g. from a dimensionally stable plastic material, such as a fiber-reinforced plastic material like PA GF40, whereby in particular metal reinforcements can be omitted.

As a welt-like fastening structure similar to the exemplary embodiment of FIGS. 1 to 4, a front portion of the housing lower shell 61 forms finger-like protrusions 23 (cf. in particular FIG. 10) which enclose the front portion 12 of the frame part 1 and thus fix the housing lower shell 61 to the frame part 1 by form fit. With the housing lower shell 61 the gas bag 3 attached to the same also is fixed to the frame part 1. The protrusions 23 are distributed along the entire vertical length of the housing lower shell 61, so that a connection of the housing lower shell 61 and hence of the gas bag 3 is effected along almost the entire length of the gas bag module housing.

Figure 9:
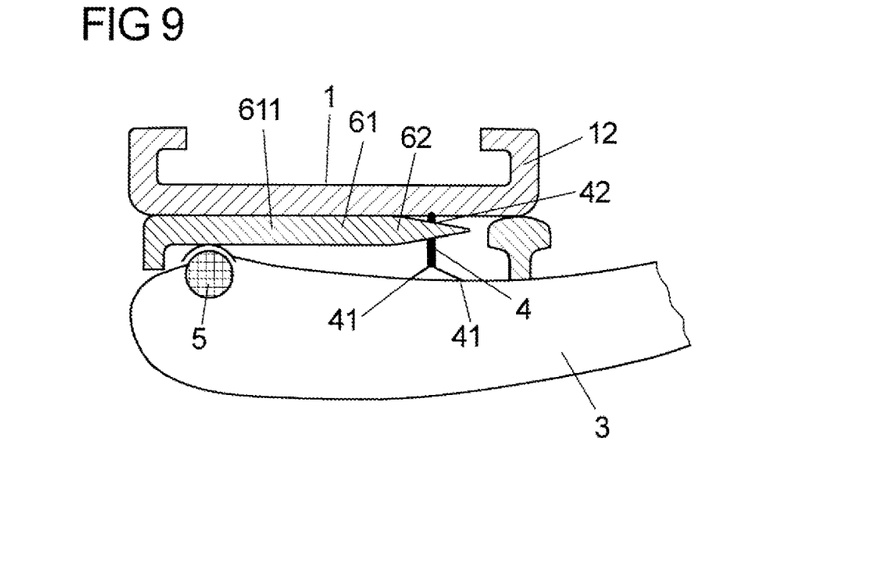
FIG. 9 shows a section along B-B in FIG. 7.

As shown in FIG. 9, a fabric element 4 in turn serves for attaching the gas bag 3 to the housing lower shell 61, which on the one hand is fixed to the gas bag 3 (via seams 41) and on the other hand has a slot-like opening 42 via which it is hooked into a connecting structure 62 of the housing lower shell 61. The connecting structure 62 is obtained by cutting free, wherein a U-shaped cut 620 in a bottom 611 of the housing lower shell 61 produces the connecting structure 62 and the fabric element 4 is attached to the connecting structure 62 through the cut 620.

Figure 7:
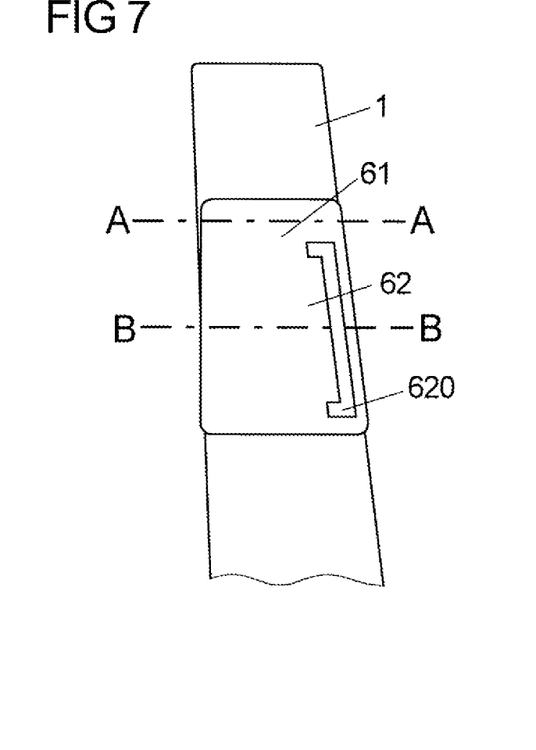
FIG. 7 schematically shows a lateral partial view of a backrest assembly of a vehicle seat according to a third exemplary embodiment of the invention.
Figure 8:
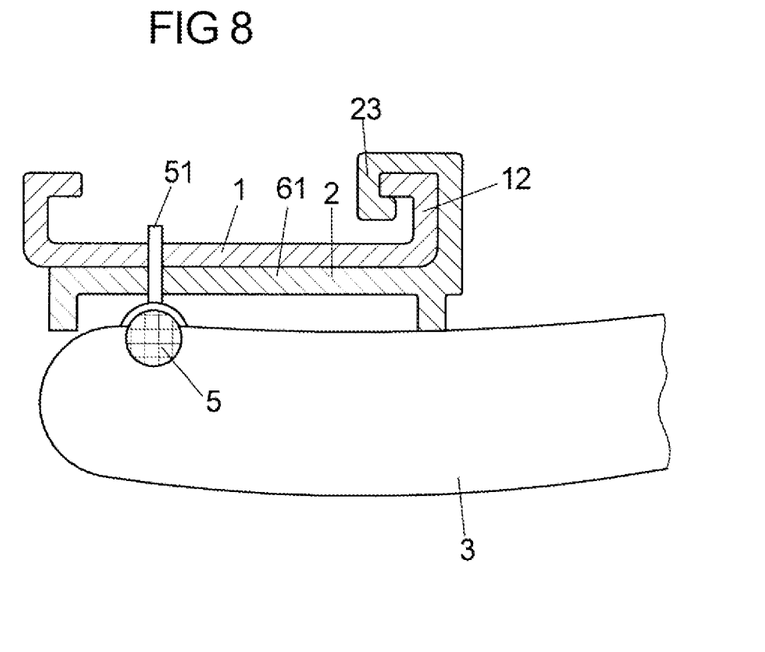
FIG. 8 shows a section along A-A in FIG. 7.
Figure 10:
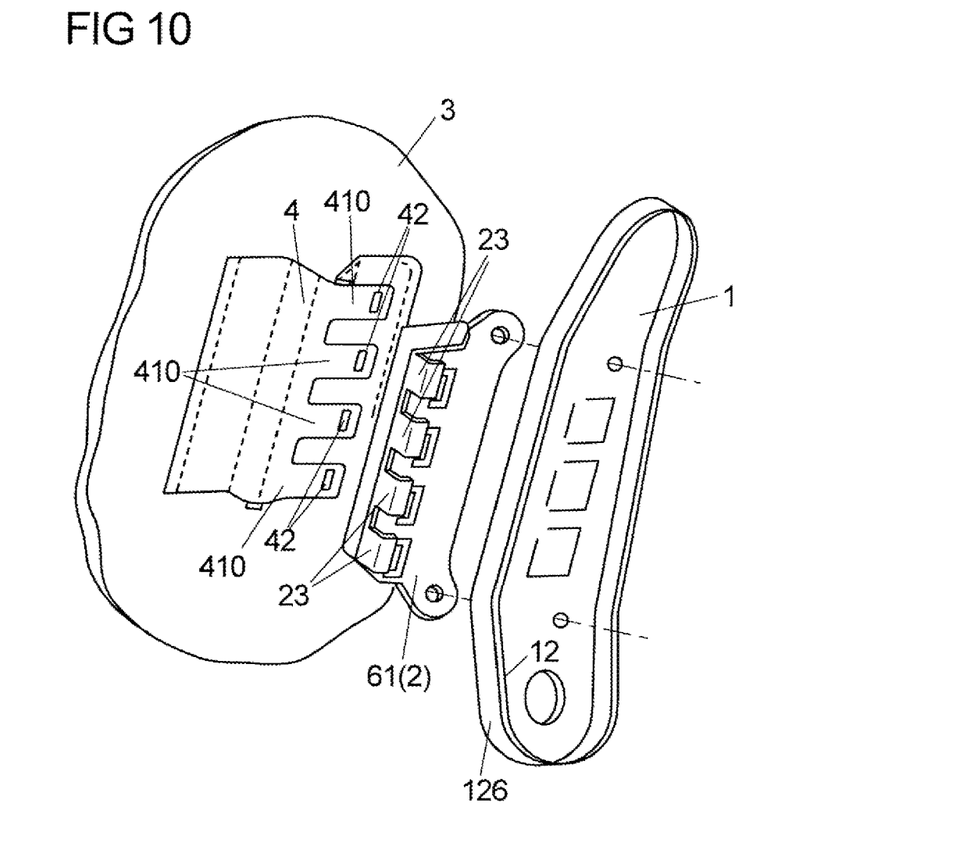
FIG. 10 shows a perspective view of the backrest assembly of FIG. 7.
Figure 11:
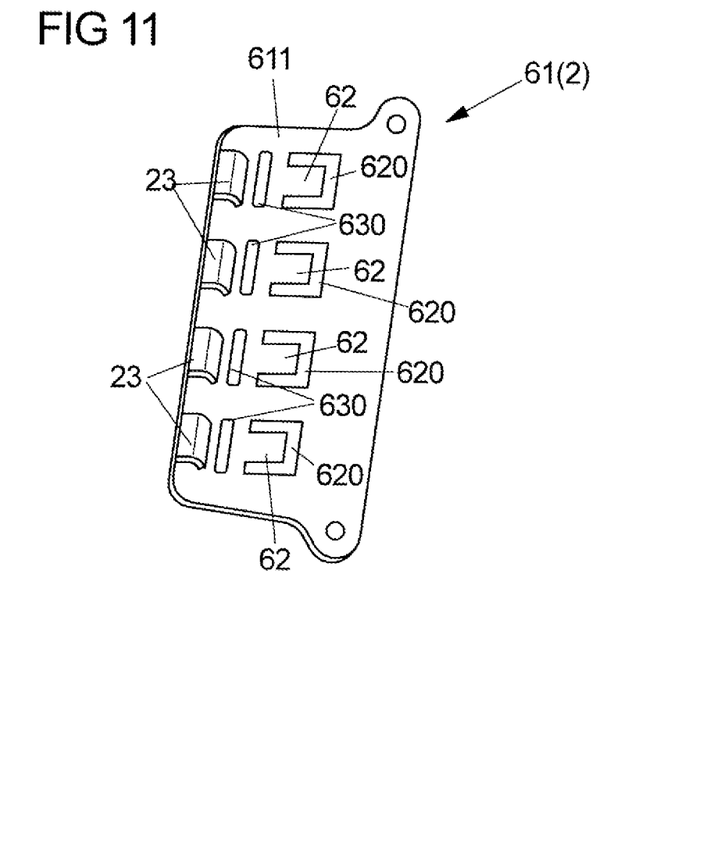
FIG. 11 shows the retaining element of FIG. 10.

A modification of the exemplary embodiment of FIGS. 7 to 9 is shown in FIGS. 10 and 11. Accordingly, the fabric part 4 is not connected with the housing lower shell 61 via a single slot-like opening 42, but the fabric element 4 has several tabs 410 spaced apart from each other in a vertical direction, which each include a fastening opening 42. With each of the tabs 410 one of several cut-free tab-like connecting structures 62 of the housing lower shell 61 is associated; cf. in particular FIG. 11, which shows the housing lower shell 61 (i.e. which corresponds to the retaining element 2) of FIG. 10. With the connecting structures 62 slots 630 each are associated, through which the tabs 410 of the fabric element 4 are guided and via which the fastening openings 42 are hooked in at the connecting structures 62.

Figure 12:
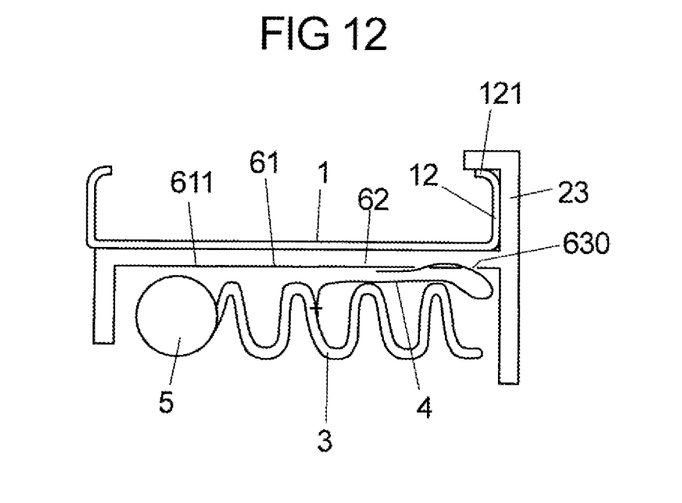
FIG. 12 shows a sectional view of a backrest assembly of a vehicle seat according to a fourth exemplary embodiment of the invention.
Figure 13:
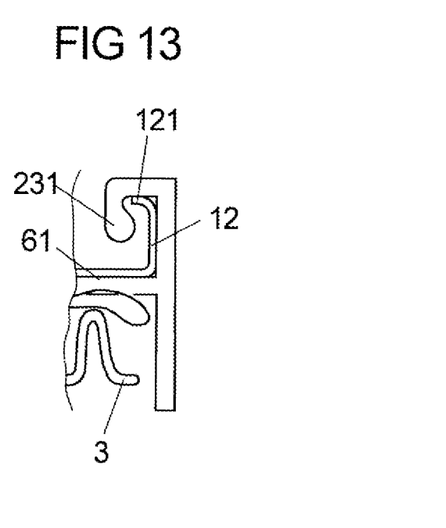
FIG. 13 shows a modification of FIG. 12.
Figure 14:
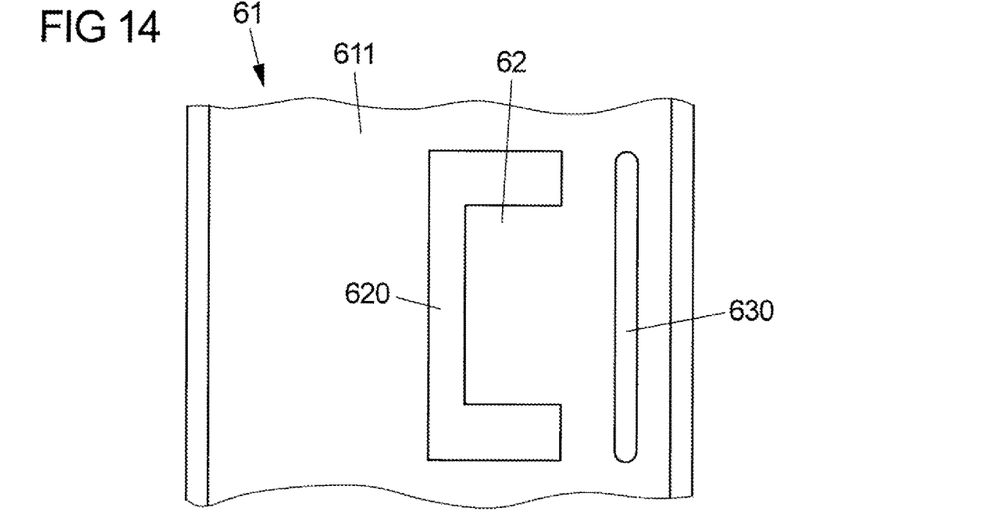
FIG. 14 shows a top view of a portion of a part of a gas bag module housing.
Figure 15:
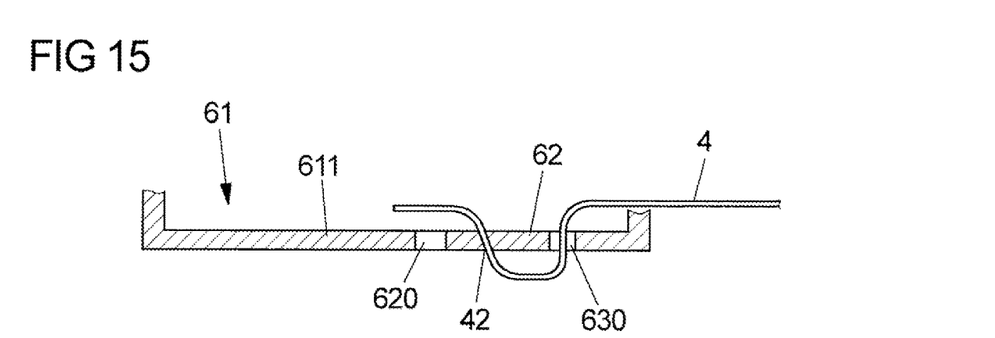
FIG. 15 shows a section through the housing part of FIG. 14.
Figure 16:
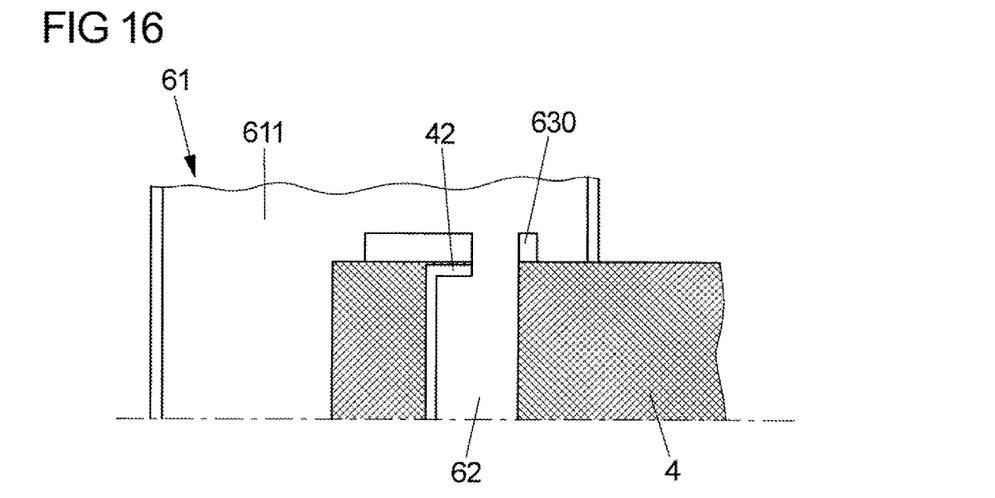
FIG. 16 shows a top view of the assembly of FIG. 15.

Another modification of the exemplary embodiment of FIGS. 7 to 9 is shown in FIGS. 12 to 17, wherein FIG. 13 shows a modification of FIG. 12. Similar to FIG. 7, a bottom 611 of the housing lower shell 61 forms a connecting structure 62 at which the fabric element 4 is hooked in. In addition a slot 630 is disposed in the bottom 611 (analogous to FIGS. 10 and 11), through which a portion of the fabric element 4 is guided and then attached to the connecting structure 62 by means of the fastening opening 42.

The attachment of the housing lower shell 61 to the frame part 1 is effected via protrusions 23, analogous to FIGS. 7 to 11. In the modification of FIG. 13, these protrusions 23 each include a thickened portion 231 via which the protrusions are hooked into the front portion 12 of the frame part 1 and in particular provide for a latching connection with the frame part 1 (with the front portion 12). In particular, the thickened portion 231 is designed such that it at least partly engages behind an inner edge 121 of the frame part 1 protruding from the front portion 12.

Figure 17:
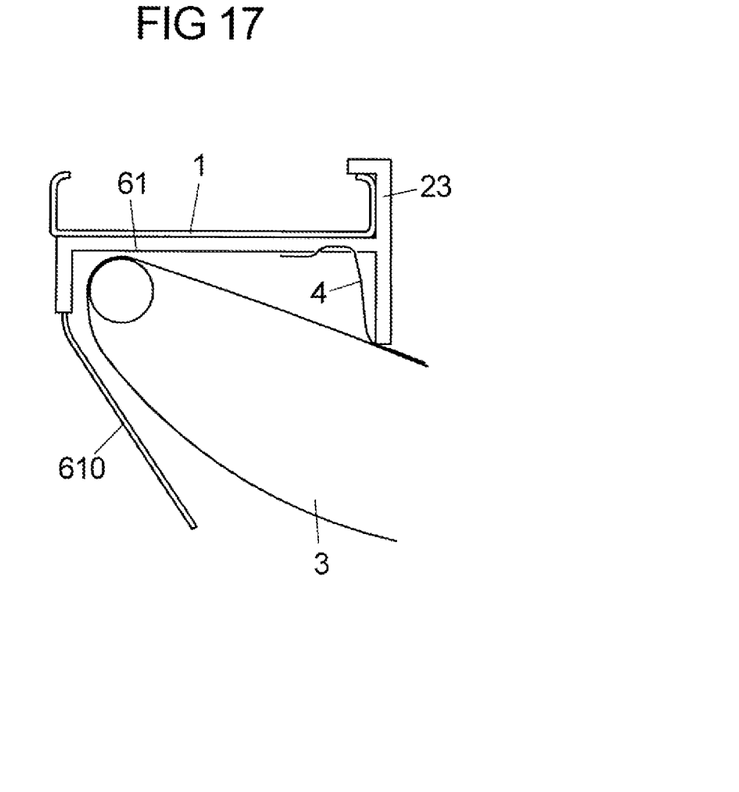
FIG. 17 shows the assembly of FIG. 12 after activation of the gas bag.

FIG. 17 shows the situation after an activation of the gas bag 3. The activated gas bag 3 presses away a housing upper part 610, which is connected with the housing lower shell 61 in a hinge-like manner, and deploys through between the housing upper part and the housing lower shell 610, 61 out of the housing (and out of the vehicle seat).

Figure 18:
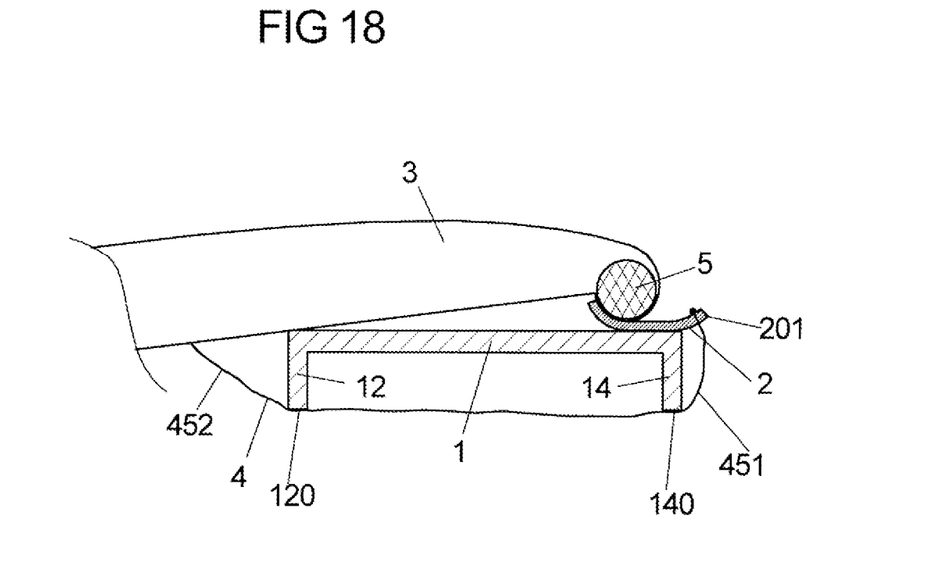
FIG. 18 shows a section through a backrest assembly of a vehicle seat according to a fifth exemplary embodiment of the invention.
Figure 19:
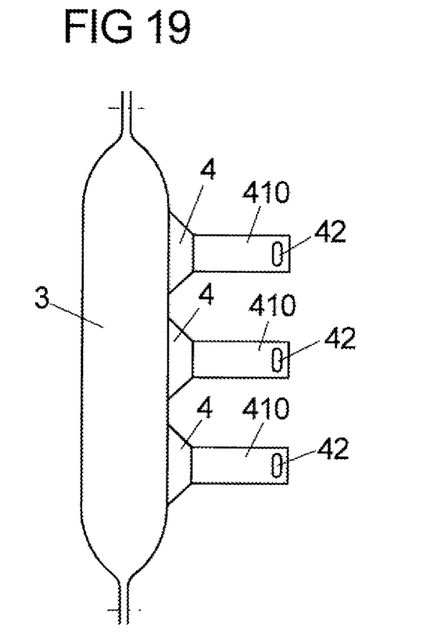
FIG. 19 shows a side view of the gas bag of the backrest assembly of FIG. 18.
Figure 20:
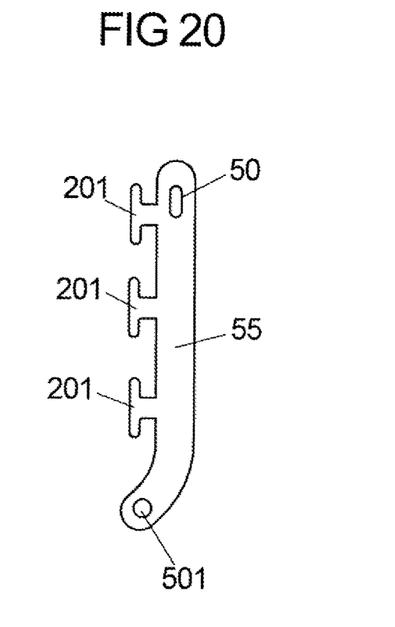
FIG. 20 shows a side view of the retaining element of the backrest assembly of FIG. 18.

FIGS. 18 to 20 relate to a vehicle seat of the invention according to a further aspect of the invention. Accordingly, the retaining element 2 at the same time serves as a gas generator support, wherein the gas generator 5 is fixed to an outer side of the frame part 1 (facing the gas bag 3) via the retaining element 2. In addition, the fabric element 4 extends along an inner side of the frame part 1 up to the retaining element 2 and via an end portion 451 is connected with a rear region of the retaining element 2 disposed on the outer side of the frame part 1. The fabric element 4 furthermore is fixed to the gas bag 3 with a front portion 452, wherein the front portion 452—as seen in the direction of forward travel—is disposed before the frame part 1 and the end portion 451 behind the frame part 1.

In the inflated condition of the gas bag 3 the fabric element 4 comes to bear against an edge 120 of the front portion 12 pointing away from the gas bag 3 (towards the middle of the backrest) and against an edge 140 of a rear portion 14 of the frame part 1. The edges 120, 140 form an abutment for the fabric element 4 and hence for the gas bag 3, whereby the gas bag 3 is supported. In an impact of a vehicle occupant on the gas bag 3, a movement of the gas bag 3 in the direction of the point of collision thus is counteracted.

The retaining element 2, which as mentioned above is a (e.g. conventional) gas generator support, in particular includes a plurality of hooks 201 via which it engages into fastening openings 42 of several fastening tabs 410 of the fabric element 4, whereby the fabric element 4 is fixed to the retaining element 2. In addition, the retaining element 2 comprises an upper fastening hook 50, which is hooked into a corresponding fastening opening of the frame part 1, and a lower fastening opening 501 via which a screw connection with the frame part 1 exists. According to another exemplary embodiment of the invention (FIGS. 21 to 27) the retaining element 2 is formed different from a gas generator support 55 and arranged on an inner side of the frame part 1 (facing away from the gas bag 3).

Analogous to FIG. 18, the gas generator support 55 as part of a gas bag module 500 is disposed on an outer side of the frame part 1 and is fixed to the frame part 1 via a fastening screw 56 extending through a lower fastening opening 501 of the gas generator support 55 and via an upper fastening hook 50. The fabric element 4 in turn with one portion extends on the inner side of the frame part 1, so that the stabilization of the deployed gas bag 3 explained already with reference to FIGS. 18 to 20 is effected.

Figure 21:
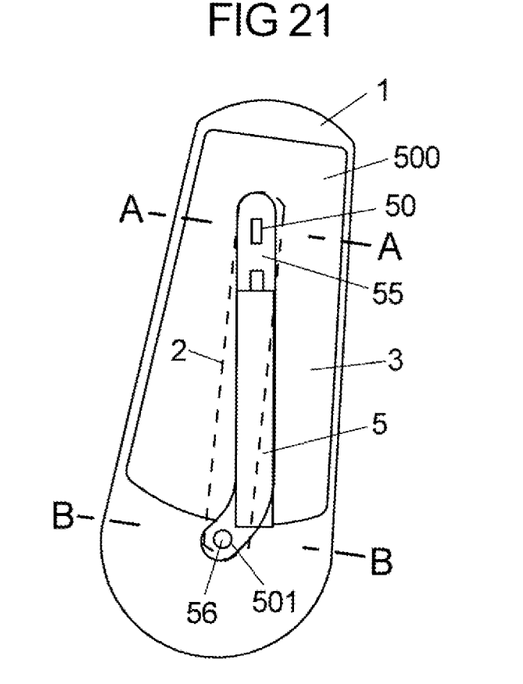
FIG. 21 shows a side view of a backrest assembly of a vehicle seat according to a sixth exemplary embodiment of the invention.
Figure 22:
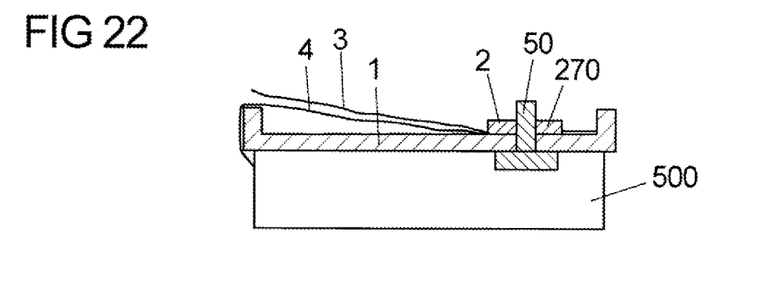
FIG. 22 shows a section along A-A in FIG. 21.
Figure 23:
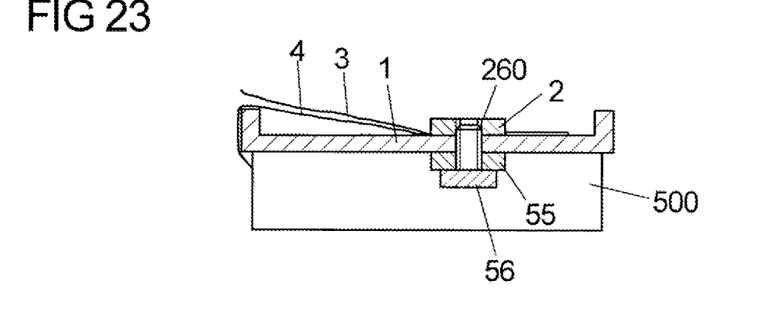
FIG. 23 shows a section along B-B in FIG. 21.

Via the fastening screw 56 and the fastening hook 50 the attachment of the retaining element 2 to the frame part 1 is effected at the same time, wherein the fastening screw 56 and the fastening hook 50 each extend through the frame part 1 and are connected with the retaining element 2 on the inner side of the frame part 1. For example, the screw 56 engages into a lower fastening opening or threaded opening 260 and the hook 50 engages into an upper fastening opening 270 of the retaining element 2.

Figure 24:
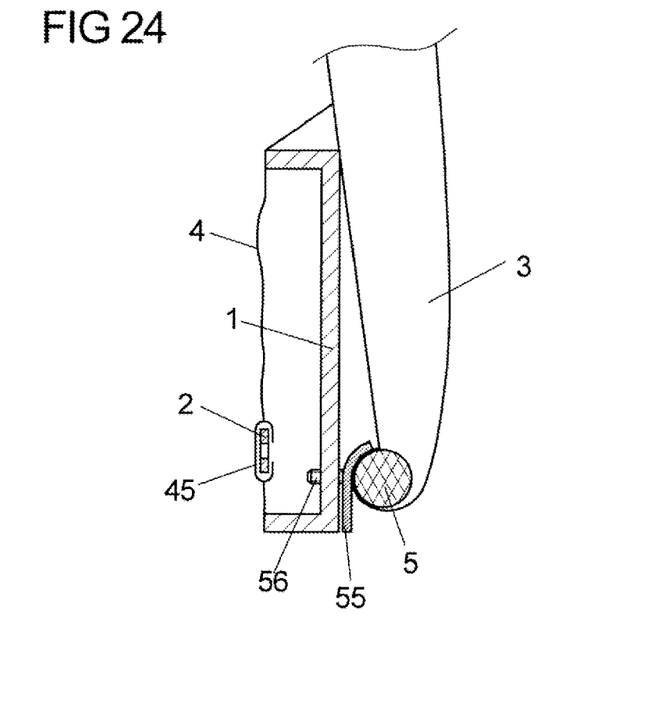
FIG. 24 shows another sectional view of the backrest assembly of FIG. 21.
Figure 25:
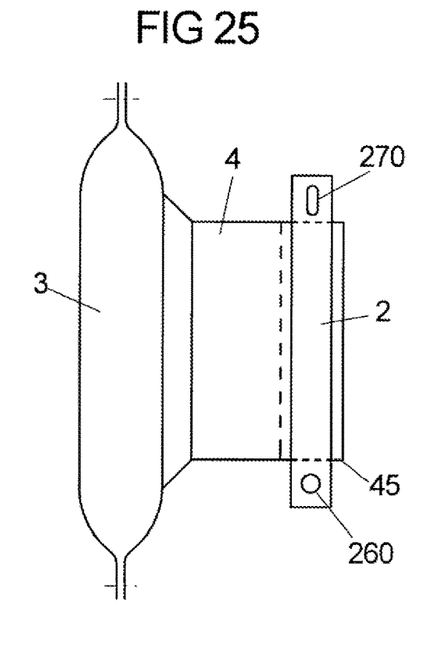
FIG. 25 shows the gas bag of the backrest assembly of FIG. 21.
Figure 26:
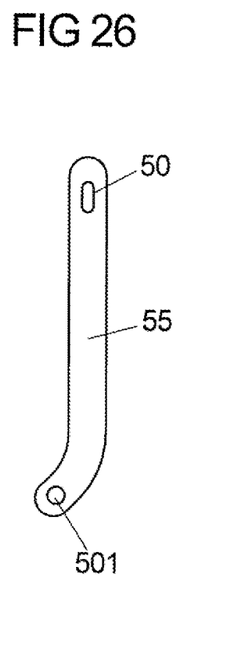
FIG. 26 shows the retaining element of the backrest assembly of FIG. 21.
Figure 27:
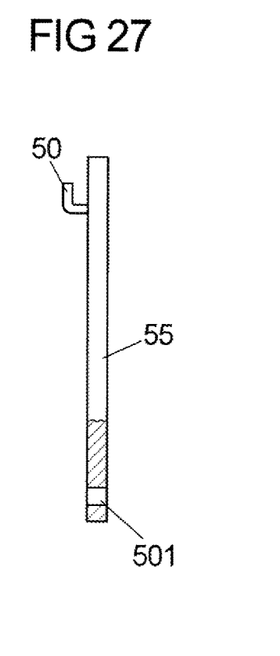
FIG. 27 shows the retaining element of FIG. 26 in a lateral view.
Figure 28:
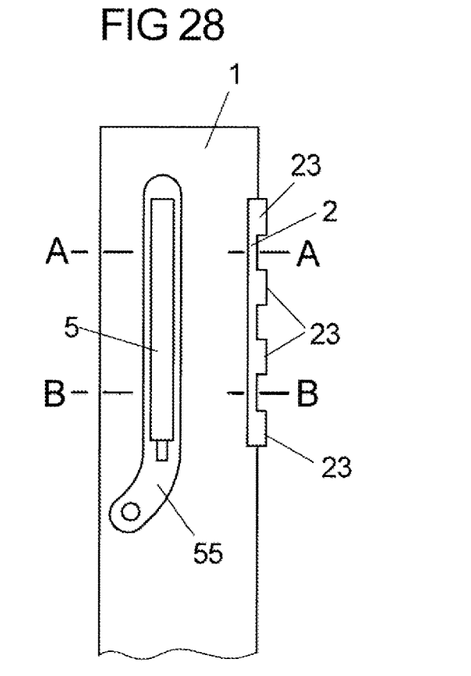
FIG. 28 shows a lateral view of a backrest assembly of a vehicle seat according to a seventh exemplary embodiment of the invention.
Figure 29:
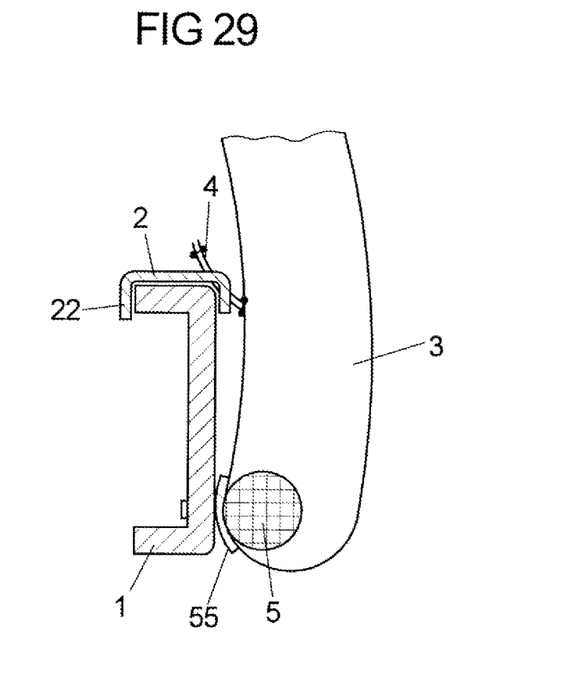
FIG. 29 shows a section along A-A in FIG. 28.
Figure 30:
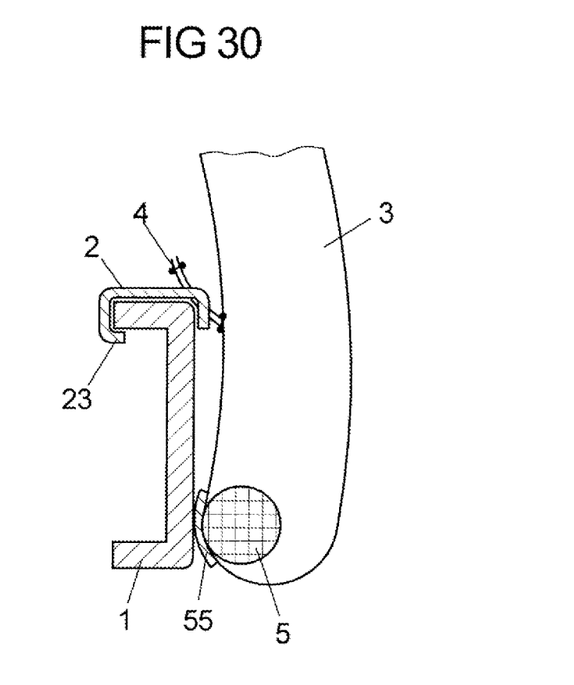
FIG. 30 shows a section along B-B in FIG. 28.
Figure 31:
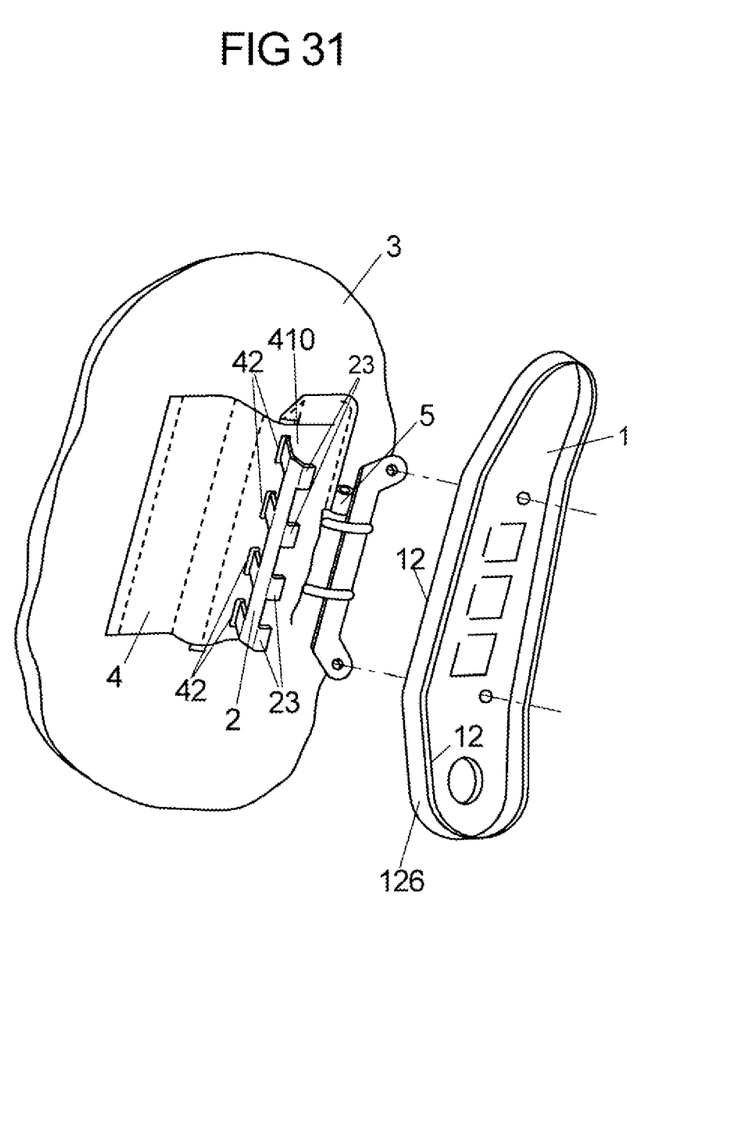
FIG. 31 shows a perspective view of the backrest assembly of FIG. 28.

The gas bag 3 in turn is fixed to the retaining element 2 via a fabric element 4, wherein the fabric element 4 for example can be formed analogous to the previous Figures and be connected with the retaining element 2. It is also conceivable, however, that the fabric element 4 forms a pocket 45 in which the retaining element 2 is arranged at least sectionally. This is illustrated in FIGS. 24 and 25, wherein FIG. 24 shows the condition before screw-connecting the retaining element 2 by means of the screw 56. In particular, the retaining element 2 protrudes from the pocket 45 with a lower portion, in which the opening 260 is disposed, and with an upper portion in which the opening 270 is disposed.

FIGS. 28 to 31 relate to another exemplary embodiment of the invention. Accordingly, the retaining element 2 is fixed to the fabric element 4 connected with the gas bag 3 in the form of a welt. The gas bag 3 is not shown in FIG. 28. The retaining element 2 forms a plurality of hook-like gas-bag-side tabs 25 with which it engages into fastening openings 42 of the fabric element 4 and in this way is fixed to the fabric element 4. The hook-like tabs 25 in particular are disposed on a long side of the retaining element 2 facing the gas bag 3.

In addition, analogous for example to the first exemplary embodiment of the invention as shown in FIGS. 1 to 4, the retaining element 2 includes hook-like protrusions 23 with which it encloses the front portion 12 of the frame part 1 and thus is fixed there. For attaching the gas generator 5 to the frame part 1 a separate gas generator support (bracket) 55 is used.

It should be noted that elements of the exemplary embodiments described above can of course also be used in combination with each other. For example, the welt of FIGS. 28 to 31 might also be arranged in the pocket 45 of the fabric element 4 shown in FIG. 25.

Furthermore, in addition to a connection to the front portion 12 of the frame part 1 via the retaining element 2 the gas bag can each also be connected in a rear region (in particular in the region of the gas generator) of the frame part 1.

The invention claimed is:

1. A vehicle seat for a motor vehicle, comprising
a gas bag inflatable for the protection of a vehicle occupant, which in the inflated condition extends on a side of the vehicle seat facing a vehicle interior,
a retaining element via which the gas bag is connected with a backrest frame of the vehicle seat, and
at least one fastening structure molded to the retaining element, via which a positive connection of the retaining element with the backrest frame exists.

2. The vehicle seat according to claim 1, wherein the fastening structure is integrally molded to the retaining element.

3. The vehicle seat according to claim 1, wherein the fastening structure encloses or extends through a portion of the backrest frame.

4. The vehicle seat according to claim 3, wherein the fastening structure comprises several protrusions spaced apart from each other, which each enclose the portion of the backrest frame.

5. The vehicle seat according to claim 1, wherein via the fastening structure the retaining element is connected with a front region of the backrest frame as seen in the direction of forward travel.

6. The vehicle seat according to claim 1, wherein the fastening structure at least partly encloses a front portion of the backrest frame, which has a side pointing in the direction of forward travel.

7. The vehicle seat according to claim 1, wherein the fastening structure extends through an opening formed in the front region of the backrest frame.

8. The vehicle seat according to claim 1, wherein via the fastening structure a latching connection exists between the retaining element and the backrest frame.

9. The vehicle seat according to claim 1, wherein the retaining element extends in a vertical direction along a lateral frame part of the backrest frame.

10. The vehicle seat according to claim 1, wherein the gas bag is connected with the retaining element via at least one connecting element.

11. The vehicle seat according to claim 10, wherein the connecting element, based on the inflated condition of the gas bag, extends along a vertical extension of the gas bag.

12. The vehicle seat according to claim 11, wherein the connecting element includes at least one fastening opening via which it is positively connected with the retaining element.

13. The vehicle seat according to claim 12, wherein the connection consists in that the fastening structure molded to the retaining element extends through the fastening opening.

14. The vehicle seat according to claim 10, wherein the connecting element is a fabric element.

15. The vehicle seat according to claim 1, further comprising a housing in which the gas bag is arranged, wherein the retaining element and the fastening structure is formed by a portion of the housing.

16. A vehicle seat for a motor vehicle, comprising
a gas bag inflatable for the protection of a vehicle occupant, which in the inflated condition extends on a side of the vehicle seat facing a vehicle interior;
a retaining element via which the gas bag is connected with a backrest frame of the vehicle seat, wherein the retaining element is formed by a gas generator support arranged on an outer side of the backrest frame;
at least one connecting element via which the gas bag is connected with the retaining element,
wherein the connecting element with one portion extends on an inner side of at least one portion of the backrest frame.

17. The vehicle seat according to claim 16, wherein the retaining element is formed by a gas generator support via which a gas generator for inflating the gas bag also is fixed to the backrest frame.

18. The vehicle seat according to claim 16, wherein the connecting element extends over the entire inner side of the backrest frame.

19. The vehicle seat according to claim 16, wherein the retaining element is arranged on the inner side of the backrest frame.

20. A vehicle seat for a motor vehicle, comprising:
a gas bag inflatable for the protection of a vehicle occupant, which in the inflated condition extends on a side of the vehicle seat facing a vehicle interior;
a retaining element via which the gas bag is connected with a backrest frame of the vehicle seat, wherein the retaining element is arranged on the inner side of the backrest frame;
at least one connecting element via which the gas bag is connected with the retaining element,
wherein the connecting element with one portion extends on an inner side of at least one portion of the backrest frame; and,
wherein on an outer side of the backrest frame a gas generator support is arranged, wherein the retaining element is connected with the gas generator support via at least one fastening element which extends through an opening in the backrest frame.

* * * * *